United States Patent Office 2,955,011
Patented Oct. 4, 1960

2,955,011
DYESTUFF COMPOSITIONS

Robert C. Riegel, University City, Mo., assignor, by mesne assignments, to General Aniline & Film Corporation, New York, N.Y., a corporation of Delaware No Drawing. Filed July 16, 1956, Ser. No. 597,839

4 Claims. (Cl. 8—85)

This invention relates to dyestuff compositions, and more particularly to direct dyestuff compositions and methods for stabilizing an aqueous direct dyestuff solution normally unstable at room temperatures.

Briefly, the invention is directed to a dye-stuff composition comprising a direct dyestuff, which is normally unstable at room temperature in aqueous solution, and polyvinylpyrrolidone. The invention also includes the method of stabilizing an aqueous direct dyestuff solution by adding to the solution a minor amount of polyvinylpyrrolidone.

Among the several objects of the invention may be noted the provision of novel dyestuff compositions; the provision of such compositions which are useful for forming aqueous solutions stable at room temperatures; the provision of novel methods for stabilizing aqueous dyestuff solutions normally unstable at room temperatures; the provision of methods for rescuing aqueous dyestuff solutions which have partially or wholly thickened or gelled; and the provision of compositions and methods of this type which are economical and convenient to use. Other objects and features will be in part apparent and in part pointed out hereinafter.

The invention accordingly comprises the products and methods hereinafter described, the scope of the invention being indicated in the following claims.

Direct dyestuffs, i.e., dyestuffs which dye cellulosic fibers directly, are commonly employed in various types of coloring operations, and are generally utilized in the form of aqueous solutions. Aqueous solutions of certain direct dyestuffs exhibit poor solution stability when cooled to room temperature and are thereby rendered unusable or difficult to handle. The poor solution stability of such direct dyestuffs may manifest itself in various ways. Thus, the direct dyestuff may precipitate or come out of solution after a short period of time or the solution may thicken or gel. In any event, the poor solution stability interferes with the normal use of the dyestuff in coloring operations.

In accordance with the present invention, I have found that aqueous solutions of direct dyestuffs which are normally unstable at room temperatures may be stabilized by incorporating therein a minor proportion of polyvinylpyrrolidone. The polyvinylpyrrolidone may be mixed dry with direct dyestuffs prior to dispersion of the mixture in water, or it may be added to an aqueous dispersion of the direct dyestuff. In either case, upon subsequent heating and cooling to room temperature of the aqueous dispersion, a dyestuff solution stable at room temperatures is formed. The term "solution" as used herein with reference to direct dyestuffs includes not only true solutions but also semicolloidal or colloidal solutions or dispersions.

The proportion of polyvinylpyrrolidone to direct dyestuff required for stabilization of an aqueous solution thereof is dependent in part on the concentration of the direct dyestuff in the solution and to a minor extent on the particular direct dyestuff itself. I have found that relatively minor amounts of polyvinyl pyrrolidone are effective to stabilize an aqueous dyestuff solution for a sufficient time at room temperatures to enable the solution to be employed in the conventional manner, and that somewhat larger amounts will render the solution stable indefinitely at room temperatures. In general, a proportion of approximately 0.1 to 2 parts by weight of polyvinylpyrrolidone to approximately 1 to 3 parts by weight of the direct dyestuff is sufficient to give a solution that is stable.

The invention may be conveniently carried out by mixing the direct dyestuff and polyvinylpyrrolidone in a dry state, followed by dispersing the mixture in water, heating the resulting aqueous dispersion to boiling and then cooling the resulting solution to room temperature. The invention may also be carried out by first dissolving polyvinylpyrrolidone in water, dispersing the direct dyestuff in the resulting solution and then heating and cooling as described above.

It is preferred that relatively soft water be employed in practicing the invention. If hard water is employed, I have found that slightly higher amounts of polyvinylpyrrolidone are required to effect stabilization of the aqueous dyestuff solutions at room temperatures. In connection with certain direct dyestuffs, it has been found beneficial to employ completely soft water. In such instances, a chelating agent such as the tetrasodium salt of ethylene-diaminetetraacetic acid may be included in the solution. Optionally, a wetting agent such as sulfonated castor oil may also be included in the aqueous solutions.

In accordance with the present invention, it has been found that polyvinylpyrrolidone is useful to rescue or reconstitute aqueous dyestuff solutions which have already partially or wholly thickened or gelled. For this purpose, the polyvinylpyrrolidone may be added to the thickened or gelled solution, which, after heating and cooling as described above, is found to be effectively stabilized against thickening or gelling again. Substantially the same proportions of polyvinylpyrrolidone mentioned above may be used in rescuing thickened or gelled aqueous direct dyestuff solutions in accordance with the invention, but somewhat higher amounts may also be used.

The following examples illustrate the invention.

Example 1

Sulfonated castor oil (70% solution, 1 ml.) was added to water (600 ml.) having a hardness of 1.5 grains of calcium carbonate per gallon. A direct dyestuff (marketed under the trade designation "Chloramine Red B," Colour Index, Second Edition, 1956, No. (hereinafter abbreviated C.I.) 22240 by Sandoz Chemical Works, Inc.) (10 g.) was then added to the water and the resulting dispersion was heated to boiling with stirring. An additional amount (400 ml.) of cold soft water was then added, and the solution was cooled in a water bath to room temperature. The resulting solution contained 1% by weight of the direct dyestuff. The solution was found to be unstable upon standing overnight at room temperature, and the direct dyestuff came out of solution.

Two additional solutions were prepared as described above containing 1.5% by weight and 2% by weight, respectively, of the direct dyestuff. In each of these cases, the resulting solutions were found to be unstable at room temperature. The dyestuff began coming out of solution after two hours at room temperature, and was completely out of solution upon standing overnight.

Example 2

Sulfonated castor oil (70% solution, 1 ml.) was added to water (600 ml.) having a hardness of 1.5 grains of calcium carbonate per gallon. Polyvinylpyrrolidone (5 g.) was then added with stirring until dissolved. This required about a minute. A direct dyestuff (marketed under the trade designation "Chloramine Red B," C.I. 22240, by Sandoz Chemical Works, Inc.) (10 g.) was then added and the dispersion was heated to boiling with stirring. An additional volume (400 ml.) of cold soft water was then added, and the resulting solution was cooled to room temperature in a water bath. The dyestuff solution contained 1% by weight of the dyestuff and 0.5% by weight of polyvinylpyrrolidone, and was found to be stable indefinitely at room temperature.

Three additional solutions were prepared as described above containing 1.5% by weight, 2% by weight and 3% by weight, respectively, of the direct dyestuff and 0.75% by weight, 1% by weight and 1.5% by weight, respectively, of polyvinylpyrrolidone. The resulting solutions containing 0.75% by weight and 1% by weight of polyvinylpyrrolidone were found to be stable indefinitely at room temperature and the solution containing 1.5% by weight of polyvinylpyrrolidone was found to be stable for approximately thirty hours at room temperature.

*Example 3*

The procedure of Example 1 was repeated in preparing an aqueous solution containing 1% by weight of a direct dyestuff (marketed under the trade designation of "Diamine Scarlet 3BA–CF," C.I. 23630, by General Dyestuff Corp.). The resulting solution was found to be unstable, the dyestuff coming out of solution even before the solution had been cooled to room temperature. Upon standing overnight, the viscosity of the solution increased and the dyestuff continued to come out of solution.

*Example 4*

The procedure of Example 2 was repeated in preparing an aqueous solution containing 1% by weight of the direct dyestuff employed in Example 3 and 0.33% by weight of polyvinylpyrrolidone. An aqueous solution containing 2% by weight of the dyestuff and 1% by weight of polyvinylpyrrolidone was also prepared. These solutions were found to be stable indefinitely at room temperature.

*Example 5*

The procedure of Example 1 was repeated in preparing an aqueous solution containing 1% by weight of a direct dyestuff (marketed under the trade designation of "Diamine Scarlet BA–CF," C.I. 23630, by General Dyestuff Corp.). The resulting solution was found to be unstable at room temperature. The solution became quite viscous after cooling, and upon standing overnight the dyestuff came out of solution.

*Example 6*

The procedure of Example 2 was repeated in preparing an aqueous solution containing 2% by weight of the direct dyestuff employed in Example 5 and 1% by weight of polyvinylpyrrolidone. The resulting solution was found to be stable indefinitely at room temperature.

*Example 7*

The procedure of Example 1 was repeated in preparing aqueous solutions containing 1% by weight, 1.5% by weight and 2% by weight, respectively, of a direct dyestuff (marketed under the trade designation "Amanil Fast Orange W.S. 200%, C.I. 29155, by American Aniline Products, Inc.). In each instance, the resulting solution was found to be unstable at room temperature and the dyestuff began coming out of solution immediately after cooling. Upon standing overnight at room temperature, the dyestuff came completely out of solution in each instance.

*Example 8*

The procedure of Example 2 was repeated in preparing aqueous solutions containing 1% by weight, 1.5% by weight and 2% by weight, respectively, of the direct dyestuff employed in Example 7, and 1% by weight, 1.8% by weight and 2.8% by weight, respectively, of polyvinylpyrrolidone. The resulting solutions containing 1% by weight and 1.8% by weight of polyvinylpyrrolidone were found to be stable indefinitely at room temperature, while the solution containing 2.8% by weight of polyvinylpyrrolidone was found to be stable for approximately thirty hours at room temperature.

*Example 9*

The procedure of Example 1 was repeated in preparing aqueous solutions containing 1.5% by weight and 2% by weight, respectively, of a direct dyestuff (marketed under the trade designation "Trianol Direct Fast Scarlet 8BC," C.I. 29190, by Commonwealth Color and Chemical Co.). In each instance the resulting solutions were found to be unstable at room temperature. The viscosity of the solutions began to increase upon cooling, and upon standing overnight each of the solutions was found to be quite viscous.

*Example 10*

The procedure of Example 2 was repeated in preparing aqueous solutions containing 2% by weight and 3% by weight, respectively, of the dyestuff employed in Example 9 and 0.66% by weight and 1% by weight, respectively, of polyvinylpyrrolidone. The resulting solutions were found to be stable indefinitely at room temperature.

*Example 11*

The procedure of Example 1 was repeated in preparing an aqueous solution containing 2% by weight of a direct dyestuff (marketed under the trade designation "Direct Fast Orange SE Ex. Conc.," C.I. 29150, by Ciba Co.). It was found impossible to get the dyestuff into solution even when the solution had been heated to boiling.

*Example 12*

The procedure of Example 2 was repeated in preparing an aqueous solution containing 1% by weight of the direct dyestuff employed in Example 11 and 1% by weight of polyvinylpyrrolidone. The resulting solution was found to be stable for approximately thirty hours at room temperature.

*Example 13*

The procedure of Example 1 was repeated in preparing aqueous solutions containing 1.5% by weight, 2% by weight, and 3% by weight, respectively, of a direct dyestuff (marketed under the trade designation "Pontamine Fast Scarlet 4 BA," C. I. 29185, by E. I. du Pont de Nemours & Co.). While the resulting solutions containing 1.5% by weight and 2% by weight were stable immediately after cooling, upon standing overnight they became murky. The resulting solution containing 3% by weight gelled upon cooling to room temperature.

*Example 14*

The procedure of Example 2 was repeated in preparing aqueous solutions containing 1.5% by weight, 2% by weight and 3% by weight, respectively, of the direct dyestuff employed in Example 13, and 0.5% by weight, 0.66% by weight and 1.5% by weight, respectively, of polyvinylpyrrolidone. In each instance, the resulting solution was found to be stable indefinitely at room temperature.

*Example 15*

The procedure of Example 1 was repeated in preparing an aqueous solution containing 1% by weight of a direct dyestuff (marketed under the trade designation "Diphenyl Fast Yellow 3GP Supra," C. I. 40001, by Geigy Co., Inc.). The resulting solution was found to be unstable at room temperature. The dyestuff began coming out of solution about one hour after the solution had been cooled, and upon standing overnight the dyestuff came out of solution as a flocculent precipitate.

*Example 16*

The procedure of Example 2 was repeated in preparing aqueous solutions containing 1% by weight, 1.5% by weight, 2% by weight and 3% by weight, respectively, of the direct dyestuff employed in Example 15, and 0.66% by weight, 1% by weight, 2% by weight and 3% by weight, respectively, of polyvinylpyrrolidone. In each instance, the resulting solution was found to be stable indefinitely at room temperature.

*Example 17*

The procedure of Example 1 was repeated in preparing aqueous solutions containing 1% by weight, 1.5% by weight and 2% by weight, respectively, of a direct dyestuff (marketed under the trade designation "Pontamine Fast Yellow SxP Conc.," C. I. 40001, by E. I. du Pont de Nemours & Co.). The solutions also contained 0.5% by weight of a 30% solution of the tetrasodium salt of ethylenediaminetetraacetic acid. In each instance, the resulting solution was found to be unstable at room temperature. The dyestuff began coming out of solution immediately after cooling, and upon standing overnight a gel was formed.

*Example 18*

The procedure of Example 2 was repeated in preparing aqueous solutions containing 1% by weight, 1.5% by weight, 2% by weight and 3% by weight, respectively, of the direct dyestuff employed in Example 17 and 0.33% by weight, 0.5% by weight, 0.66% by weight and 1.5% by weight, respectively, of polyvinylpyrrolidone. The solutions also contained 0.5% by weight of a 30% solution of the tetrasodium salt of ethylenediaminetetraacetic acid. In each instance, the resulting solution was found to be stable indefinitely at room temperature.

*Example 19*

The procedure of Example 1 was repeated in preparing aqueous solutions containing 1% by weight, 1.5% by weight and 2% by weight, respectively, of a direct dyestuff (marketed under the trade designation "Pontamine Fast Yellow 4GL Conc.," C. I. 29000, by E. I. du Pont de Nemours & Co.). The solutions also contained 0.5% by weight of a 30% solution of the tetrasodium salt of ethylenediaminetetraacetic acid. In each instance, the resulting solution was found to be unstable, a flocculent gel forming immediately upon cooling to room temperature.

*Example 20*

The procedure of Example 2 was repeated in preparing aqueous solutions containing 1% by weight, 1.5% by weight, 2% by weight and 3% by weight, respectively, of the direct dyestuff employed in Example 19, and 0.33% by weight, 0.5% by weight, 0.66% by weight and 1% by weight, respectively, of polyvinylpyrrolidone. The solutions also contained 0.5% by weight of a 30% solution of the tetrasodium salt of ethylenediaminetetraacetic acid. Each of these solutions was found to be stable indefinitely at room temperature.

*Example 21*

The procedure of Example 1 was repeated in preparing aqueous solutions containing 1% by weight, 1.5% by weight and 2% by weight, respectively, of a direct dyestuff (marketed under the trade designation "Pontamine Yellow C H Conc.," C. I. 24895, by E. I. du Pont de Nemours & Co.). In each instance, the resulting solution was found to be unstable, a very viscous gel forming immediately upon cooling to room temperature.

*Example 22*

The procedure of Example 2 was repeated in preparing aqueous solutions containing 1% by weight, 1.5% by weight, 2% by weight and 3% by weight, respectively, of the direct dyestuff employed in Example 21, and 2% by weight, 3% by weight, 4% by weight and 6% by weight, respectively, of polyvinylpyrrolidone. Each of these solutions was found to be stable indefinitely at room temperature.

*Example 23*

A mixture of polyvinylpyrrolidone (10 g.) and a direct dyestuff (marketed under the trade designation "Pontamine Fast Yellow 4GL Conc.," C. I. 29000, by E. I. du Pont de Nemours & Co.) (30 g.) was prepared. The mixture was dispersed in water (600 ml.) having a hardness of 1.5 grains of calcium carbonate per gallon and containing a small amount (1 ml. 70% solution) of sulfonated castor oil. The resulting dispersion was heated to boiling with stirring. An additional amount (400 ml.) of cold soft water was then added, and the solution was cooled in a water bath to room temperature. The resulting solution, which contained 3% by weight of the direct dyestuff and 1% by weight of polyvinylpyrrolidone, was found to be stable indefinitely.

*Example 24*

Sulfonated castor oil (70% solution, 1 l.) was added to water (600 l.) having a hardness of 1.5 grains of calcium carbonate per gallon. A direct dyestuff (marketed under the trade designation "Pontamine Fast Yellow 4GL Conc.," C.I. 29000, by E. I. du Pont de Nemours & Co.) (30 kg.) was then added to the water and the resulting dispersion was heated to boiling with stirring. An additional amount (400 l.) of cold soft water was then added and the solution was cooled to room temperature. Upon cooling, the solution was found to be unstable and a fluocculent gel formed.

Polyvinylpyrrolidone (10 kg.) was added to the gelled solution, and the resulting mixture was heated to boiling. Upon being cooled to room temperature, the resulting solution was found to be stable indefinitely.

*Example 25*

Sulfonated castor oil (70% solution, 1 l.) was added to water (600 l.) having a hardness of 1.5 grains of calcium carbonate per gallon, followed by the addition of polyvinylpyrrolidone (1 kg.). A direct dyestuff (marketed under the trade designation "Direct Benzol Orange R," C.I. 22130, by Sandoz Chemical Works, Inc.) (10 kg.), a direct dyestuff (marketed under the trade designation "Pontamine Fast Scarlet 4 BA," C.I. 29185, by E. I. du Pont de Nemours & Co.) (5.8 kg.) and a chelating agent (2 l. of a 30% solution of the tetrasodium salt of ethylenediaminetetraacetic acid) were then added to the water and the resulting dispersion was heated to boiling with stirring. An additional amount (400 l.) of cold soft water was then added and the solution was cooled to room temperature. The resulting solution, which contained 1.58% by weight of the direct dyestuffs and 0.1% by weight of polyvinylpyrrolidone, was found to be stable indefinitely at room temperature.

*Example 26*

Sulfonated castor oil (70% solution, 1 l.) was added to water (600 l.) having a hardness of 1.5 grains of calcium carbonate per gallon. A direct dyestuff (marketed under the trade designation "Pontamine Fast Yellow 4GL Conc.," C.I. 29000, by E. I. du Pont de Nemours & Co.) (20 kg.) was then added to the water and the resulting dispersion was heated to boiling with stirring. An additional amount (400 l.) of cold soft water was then added and the solution was cooled to room temperature. Upon cooling, the solution was found to be unstable and a flocculent gel formed.

Polyvinylpyrrolidone (6.7 kg.) was added to the gelled solution, and the resulting mixture was heated to boiling. Upon being cooled to room temperature, the resulting solution was found to be stable indefinitely.

*Example 27*

The procedure of Example 2 was repeated in preparing an aqueous solution containing 2% by weight of a direct dyestuff (marketed under the trade designation "Pontamine Fast Yellow 4GL Conc.," C.I. 29000, by E. I. du Pont de Nemours & Co.) and 0.5% by weight of polyvinylpyrrolidone. The resulting solution was found to be stable for more than six hours at room temperature.

*Example 28*

The procedure of Example 2 was repeated in preparing an aqueous solution containing 2% by weight of a direct dyestuff (marketed under trade designation "Pontamine Fast Yellow 4GL Conc.," by E. I. du Pont de Nemours & Co.) and 0.33% by weight of polyvinylpyrrolidone. The resulting solution was found to be stable for approximately six hours at room temperature.

The expression "stable solution" as employed herein in connection with direct dyestuffs is intended to designate solutions which have been stabilized against gelling and thickening or against the dyestuff precipitating or coming out of solution within a period of less than several hours after being cooled to room temperature as described in the foregoing examples.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

I claim:

1. A dyestuff composition stabilized against gel formation in aqueous solution at room temperature and consisting essentially of a direct dyestuff which is normally unstable and forms a gel at room temperatures in aqueous solution, and about 0.1 to 2 parts by weight of polyvinylpyrrolidone.

2. A stable dyestuff composition stabilized against gel formation in aqueous solution at room temperature and consisting essentially of an aqueous solution containing a direct dyestuff which is normally unstable at room temperatures in aqueous solution, and polyvinylpyrrolidone, the proportion of the dyestuff to the polyvinylpyrrolidone being approximately 1–3 parts by weight of the dyestuff to approximately 0.1–2 parts by weight of polyvinylpyrrolidone.

3. The method of producing a stable non-gelling aqueous direct dyestuff solution comprising adding polyvinylpyrrolidone to water, dispersing a direct dyestuff in the polyvinylpyrrolidone solution, heating the resulting dispersion to boiling with stirring, and then cooling the resulting solution to room temperature, the proportion of the polyvinylpyrrolidone to the dyestuff being approximately 0.1–2 parts by weight of the polyvinylpyrrolidone to approximately 1–3 parts by weight of the dyestuff.

4. The method of stabilizing an aqueous direct dyestuff solution which has thickened comprising adding to the thickened solution from 0.1 to 2 parts by weight of polyvinylpyrrolidone for each 1 to 3 parts by weight of said dyestuff, heating the resulting mixture to boiling, and then cooling the resulting solution to room temperature.

References Cited in the file of this patent

UNITED STATES PATENTS 2,903,325      Geigy _____ Sept. 8, 1959

FOREIGN PATENTS 493,944      Belgium _____ June 16, 1950

OTHER REFERENCES

Brauer: Melliand Textilberichte Band 32, January 1951, pp. 53–56.

Am. Dyestuff Reporter, February 1, 1954, pp. 72–75 (art. by Hansen, Bergman and Witwer).